United States Patent [19]

O'Hanlon

[11] 4,217,883
[45] Aug. 19, 1980

[54] METAL SCREEN SOLAR HEAT COLLECTOR WALL

[76] Inventor: Edward J. O'Hanlon, Assembly Point, Lake George, N.Y. 12845

[21] Appl. No.: 870,481

[22] Filed: Jan. 18, 1978

[51] Int. Cl.³ .............................................. F24J 3/02
[52] U.S. Cl. ................................. 126/434; 126/450; 126/432
[58] Field of Search ........................... 126/270, 271

[56] References Cited

U.S. PATENT DOCUMENTS

| | | | |
|---|---|---|---|
| 3,832,992 | 9/1974 | Trombe | 126/270 |
| 3,875,925 | 4/1975 | Johnston | 126/270 |
| 4,068,260 | 7/1978 | Goetti | 126/270 |
| 4,068,652 | 1/1978 | Worthington | 126/270 |
| 4,073,282 | 2/1978 | Schriefer | 126/270 |
| 4,121,568 | 10/1978 | Olsen | 126/271 |

OTHER PUBLICATIONS

R. J. Lewis, Can the Sun Warm your House?, Aug. 23, 1958, Wash. Star News Paper.

*Primary Examiner*—Samuel Scott
*Assistant Examiner*—G. Anderson
*Attorney, Agent, or Firm*—Pollock, Vande Sande & Priddy

[57] ABSTRACT

A portion of the wall or an entire south wall of a shelter structure embodying a metal screen solar heat collector.

10 Claims, 3 Drawing Figures

METAL SCREEN SOLAR HEAT COLLECTOR WALL

All across this country equipment for solar heat collection added to ordinary buildings has increased excessively usual building costs. Therefore, to make fuel heated structures into those that are solar heated, a radically new type of construction must be more carefully considered and employed.

This is especially true in regard to large buildings located above north latitude 40 where winters are cold (below zero) and summers are hot (above 100° F.).

More often then not solar heat collectors usually operate using a liquid as a working fluid. If the liquid is water, during the winter it must be provided with an antifreeze solution to keep it from breaking and ruining the solar heat collector.

Such a solar heat collector with water or other liquid as its working fluid is more expensive than one using a gas or gases as their working fluid. Moreover, to make the whole south side of a building into one or more solar heat collectors is the more modern and economical way of building large or small heavily insulated shelter structures. Such is the present zeroenergy disclosure.

Up until the present the increased cost of solar heat collection added to an existing building has kept many architects from using solar heat collectors in the design of their buildings.

If they choose to use solar heat collection in the design of their shelter structure it is often because these are to be located in the northern latitudes of this country.

Figure 1:
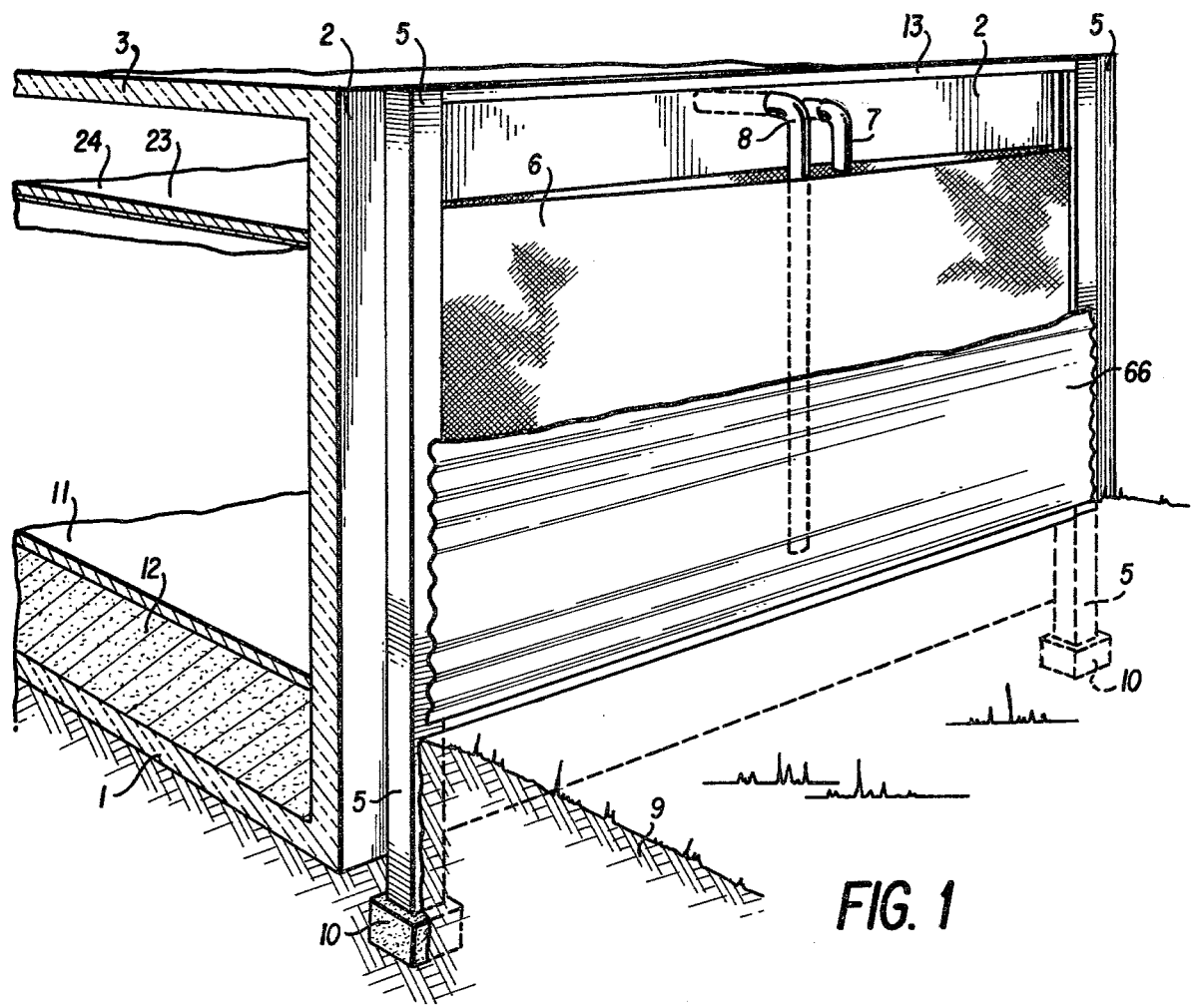
FIG. 1 shows my earliest type of wire screen solar heat collector embodied as a portion of a heavily insulated wall of a building.
Figure 3:
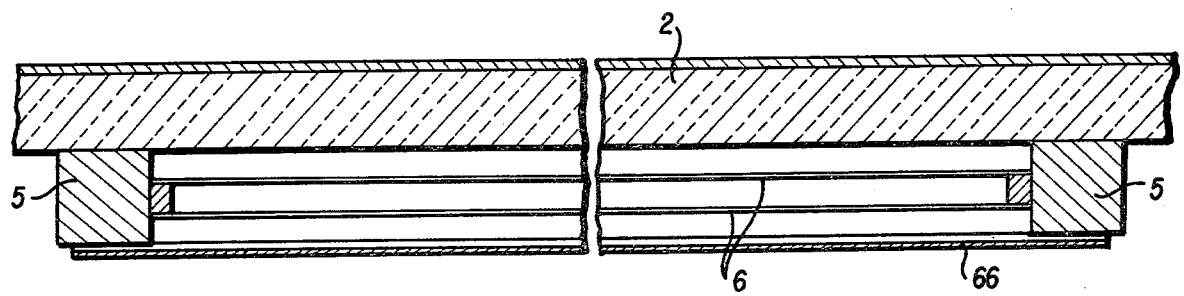
FIG. 3 shows a cross-sectional view through a portion of the wire screen solar heat collector of FIG. 2, prior to insertion of inlet and outlet passages.
Figure 2:
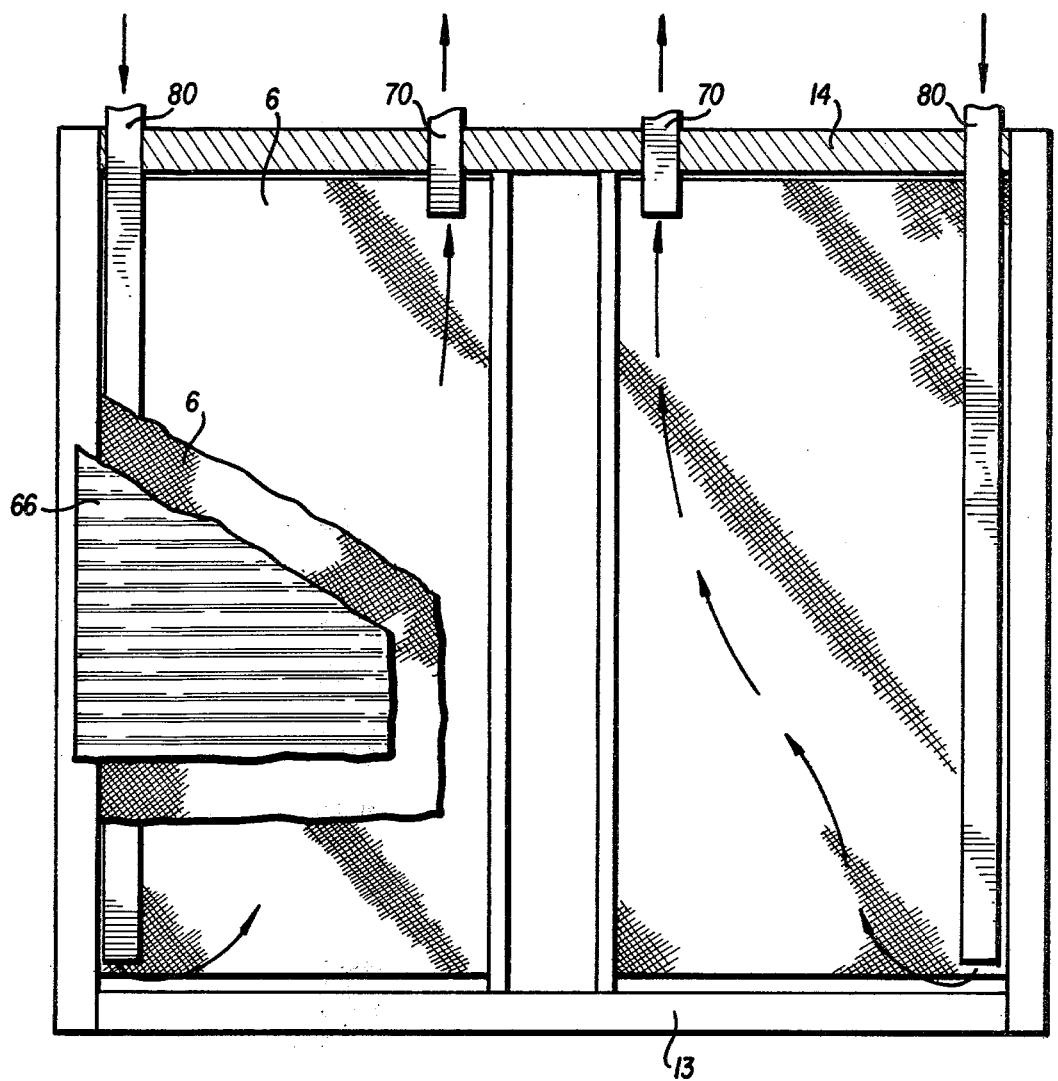
FIG. 2 illustrates an alternative, preferred embodiment of a wire screen solar heat collector as compared to the embodiment shown in FIG. 1.

FIG. 1 shows the south wall of a building in which wall numeral 1 is made of rigid plastic foam cast between two thin metallic skins. In front of this wall are two blackened metal screens 6 stretched apart along their middle. In this middle area are two tubes 7 and 8. Tube 8 brings air in to this space. Tube 7 takes air out of this same space. This screen is stretched between the vertically upper end portions of two wooden posts 5 and 5. Corrugated transparent or translucent plastic sheet 66 is placed outside of said metal screen 6 and fastened at both vertical ends to both posts 5 and 5. Along the posts and under the edge of the corrugated plastic sheet I choose to put inch wide corrugated sponge rubber strips 16 in order to prevent cold air in the winter time from getting into the area occupied by the blackened wire screen 6.

These posts are roughly 5 by 5 inches and are treated with a tarry substance so that when they are buried in the ground they will not rot or be infested with termites or other insects. In each case the vertically lower end portions of posts 5 and 5 rest on rock or concrete footings 10 and 10.

Essentially a building is a six sided affair. It comprises 4 side walls, a top (roof or ceiling) a bottom (basement or subbasement wall or floor).

In the present instance the bottom wall is 1, the south wall 2, the roof 3, and the north wall (not shown but numbered 4). Within the roof 3 is an insulated ceiling 23 held in position by cross number 25 extending from wall 3 to wall 4.

Each of the six walls is formed as a heavily insulated foam wall consisting of two thin skins with 4 inches of polyurethane rigid foam cast between them. Roof 3 and subbasement floor 1 are joined to walls 2 and 4 in a leakproof manner. All walls are composed of panels joined side wide together by the applicants well known and previously patented "Foam Lock" construction. Numeral 12 represents the solar bank. The bank of sand beneath the floor to hold heat coming in from tube # 7.

Number 66 represents a transparent or translucent member preferably a corrugated sheet of plastic.

Numeral 9 is the ground level.

Numerals 13 and 14 are enclosure members positioned at the bottom and top of solar heat collectors space, while 80 shows the intake passages, and 70 the out take air passages.

Number 66 covers a transparent or translucent member which may be corrugated transparent or translucent sheet.

I claim:
1. A solar heat collecting wall assembly comprising:
   a pair of spaced, post-like support members, each support member having a lower end portion adaptable for being fixedly supported on or beneath ground level with each support member having an attached, upper end portion extending in a substantially vertical direction above ground level, said support members each having a first side portion facing in a first direction substantially parallel to one another and said support members each having a second, oppositely disposed side portion facing in a second opposite direction substantially parallel to one another;
   first and second enclosure members each extending in a substantially parallel horizontal direction relative to one another between said pair of support members, with said first enclosure member positioned substantially vertically above said second enclosure member;
   a heavily insulated foam wall fixedly engaging the first side portion of each of said spaced support members and at least one sheet of heat transmitting material fixedly engaging the second side portion of each of said spaced support members, said pair of spaced support members, said first and second enclosure members, said heavily insulated foam wall and said sheet of heat transmitting material defining a solar heat collecting space therebetween;
   a pair of spaced, black metal screen members positioned within said solar heat collecting space, each of said screen members extending in a substantially vertical direction and having a first pair of opposite end portions attached to one of said first and second enclosure members, respectively, and a second pair of opposite end portions attached to one of said support members, respectively;
   inlet conduit means extending through an aperture in said heavily insulated foam wall located substantially adjacent to said first enclosure member and having an opening located substantially adjacent said second enclosure member and between said pair of screen members for selectively introducing a continuous flow of gaseous fluid at a first temperature into a vertically lower most portion of said solar heat collecting space, creating a natural flow of said gaseous fluid in a vertically upward direction through said solar heat collecting space; and outlet means extending through a further aperture in said heavily insulated foam wall and having an opening located substantially adjacent said first enclosure member and between said pair of screen members for removing said continuous flow of gaseous fluid at a second, higher temperature from a vertically uppermost portion said solar heat collecting space.

2. A solar heat collecting wall assembly according to claim 1, wherein said heavily insulated foam wall is formed of a rigid, polyurethane-like foam positioned between a pair of thin skins.

3. A solar heat collecting wall assembly according to claim 2, wherein said polyurethane-like foam has a cross-sectional width of at least 4 inches.

4. A solar heat collecting wall assembly according to claim 1, wherein said first enclosure member extends within a first horizontally extending plane intersecting vertically upper edge surfaces of each of said spaced, support members.

5. A solar heat collecting wall assembly according to claim 1, wherein said second enclosure member extends within a second, horizontally extending plane located adjacent to ground level.

6. A solar heat collecting wall assembly according to claim 1, wherein said outlet means comprises at least one outlet passageway extending through the further aperture in said heavily insulated foam wall, said outlet passageway having an opening positioned proximate to said first enclosure member.

7. A solar heat collecting wall assembly according to claim 1, wherein a substantial portion of said inlet passageway located within said solar heat collecting space extends in a substantially vertical direction.

8. A solar heat collecting wall assembly according to claim 6, wherein a substantial portion of said outlet passageway located within said solar heat collecting space extends in a substantially vertical direction.

9. A solar heat collecting wall assembly according to claim 1, wherein said sheet of heat transmitting material has a corrugated cross-sectional configuration and is formed of a translucent material.

10. A solar heat collecting wall assembly according to claim 1, wherein said sheet of heat transmitting material has a corrugated cross-sectional configuration and is formed of a transparent material.

* * * * *